(12) United States Patent
Post et al.

(10) Patent No.: US 11,711,500 B1
(45) Date of Patent: Jul. 25, 2023

(54) SYSTEMS AND METHODS FOR CALIBRATING DISPLAY SYSTEMS

(71) Applicant: CHRISTIE DIGITAL SYSTEMS USA, INC., Cypress, CA (US)

(72) Inventors: Matthew Post, Brampton (CA); Peter Anthony Van Eerd, Guelph (CA)

(73) Assignee: CHRISTIE DIGITAL SYSTEMS USA, INC.

( * ) Notice: Subject to any disclaimer, the term of this patent is extended or adjusted under 35 U.S.C. 154(b) by 0 days.

(21) Appl. No.: 17/589,122

(22) Filed: Jan. 31, 2022

(51) Int. Cl.
| | |
|---|---|
| H04N 17/02 | (2006.01) |
| H04N 17/00 | (2006.01) |
| G09G 3/00 | (2006.01) |
| H04N 1/60 | (2006.01) |
| H04N 1/00 | (2006.01) |
| H04N 9/31 | (2006.01) |

(52) U.S. Cl.
CPC ....... *H04N 9/3194* (2013.01); *H04N 1/00087* (2013.01); *H04N 1/6033* (2013.01); *G09G 3/006* (2013.01); *H04N 17/00* (2013.01); *H04N 17/002* (2013.01); *H04N 17/02* (2013.01)

(58) Field of Classification Search
CPC .. H04N 9/3194; H04N 9/3182; H04N 9/3147; H04N 9/3191; H04N 17/00
See application file for complete search history.

(56) References Cited

U.S. PATENT DOCUMENTS

| 8,687,068 B2 | 4/2014 | Chang et al. | |
|---|---|---|---|
| 2008/0100805 A1* | 5/2008 | Majumder | G06F 3/1446 |
| | | | 353/30 |
| 2012/0263346 A1* | 10/2012 | Datta | G06V 10/44 |
| | | | 382/103 |
| 2017/0223322 A1* | 8/2017 | Grundhofer | H04N 9/3182 |
| 2022/0078382 A1* | 3/2022 | Faragher | H04N 9/3194 |
| 2022/0253634 A1* | 8/2022 | Shrivastava | G06V 10/56 |

OTHER PUBLICATIONS

Desjardins, Danick et al. "Dense stereo range sensing with marching pseudo-random patterns." Fourth Canadian Conference on Computer and Robot Vision (CRV'07). IEEE, 2007.
Salvi, Joaquim et al. "A robust-coded pattern projection for dynamic 3D scene measurement." Pattern Recognition Letters 19.11 (1998): 1055-1065.

* cited by examiner

*Primary Examiner* — John W Miller
*Assistant Examiner* — Humam M Satti
(74) *Attorney, Agent, or Firm* — Perry + Currier Inc.

(57) ABSTRACT

A method of calibrating a display system, the method comprising: displaying a test pattern including a plurality of blobs; detecting one or more base blobs in the displayed test pattern; identifying, based on the detected base blobs, patches of the test pattern, wherein each patch comprises one of the base blobs and a subset of additional blobs detected in the displayed test pattern; determining a patch location for at least one patch within the test pattern based on the subset of the additional blobs in the patch to determine a blob location for at least one detected blob; determining a calibration parameter for the display system based on the blob location and a detected attribute of the at least one detected blob; and calibrating the projector using the calibration parameter.

21 Claims, 11 Drawing Sheets

SYSTEMS AND METHODS FOR CALIBRATING DISPLAY SYSTEMS

FIELD

The specification relates generally to display systems, and more particularly to systems and methods for calibrating display systems.

BACKGROUNDS

Display systems, such as systems with one or more projectors, cameras, or display devices, may be employed to project videos and images on a variety of different surfaces. However, the surfaces may be uneven, have their own coloring and/or imperfections, or the display devices may be misaligned and/or otherwise introduce imperfections and distortions which causes the projected image to appear distorted or otherwise inaccurate to the desired image.

SUMMARY

According to an aspect of the present specification, an example method of calibrating a display system includes: displaying a test pattern including a plurality of blobs; detecting one or more base blobs in the displayed test pattern; identifying, based on the detected base blobs, patches of the test pattern, wherein each patch comprises one of the base blobs and a subset of additional blobs detected in the displayed test pattern; determining a patch location for at least one patch within the test pattern based on the subset of the additional blobs in the patch to determine a blob location for at least one detected blob; determining a calibration parameter for the display system based on the blob location and a detected attribute of the at least one detected blob; and calibrating the display system using the calibration parameter.

According to another aspect of the present specification, an example system includes: a display system configured to display a test pattern onto a surface, the test pattern including a plurality of blobs; a camera configured to capture an image of at least a portion of the displayed test pattern; and a processor configured to: detect one or more base blobs in the test pattern; identify, based on the detected base blobs, a patch of the test pattern, wherein the patch comprises one of the base blobs and a subset of additional blobs detected in the test pattern; determine a patch location for the patch within the test pattern based on the subset of the additional blobs in the patch to determine a blob location for at least one detected blob; determine a calibration parameter for the display system based on the blob location and a detected attribute of at least one detected blob; and calibrate the display system using the calibration parameters.

According to another aspect of the present specification, another example method of calibrating a display system includes: displaying a test pattern including a plurality of blobs; identifying patches of the test pattern, wherein each patch comprises a subset of blobs detected in the displayed test pattern; determining a patch location for at least one patch within the test pattern based on the blobs in the patch; determining a blob location for each at least one detected blob in the patch based on the patch location; determining a calibration parameter for the display system based on the blob location and a detected attribute of each the at least one detected blob; and calibrating the display system using the calibration parameter.

BRIEF DESCRIPTION OF DRAWINGS

Implementations are described with reference to the following figures, in which.

DETAILED DESCRIPTION

To compensate for the effects of the surface onto which projectors and/or other display devices display images and videos, the input data may be adjusted by the display system to calibrate the output to better approximate the target. To calibrate the display system and/or to align one or more projectors or display devices relative to each other, the display system may display a test pattern onto the surface. An image of the displayed test pattern, or at least a portion of the displayed test pattern may be captured by a camera and the image analyzed to determine how to calibrate the display system. Often, in order to better differentiate between different shades and hues of various colors and/or to gather data required for modelling, multiple test patterns are required, which may result in the calibration process being time-consuming and inconvenient when initially setting up a projector.

An example test pattern in accordance with the present specification includes a plurality of blobs arranged in patches, with each patch having a white base blob defining the patch, and red, green, and blue reference blobs. The arrangement of the blobs in the patch and the inclusion of white, red, green and blue blobs allows the test pattern to be used for color compensation, geometric alignment, and luminance correction, with a single-shot test pattern. In particular, to calibrate the display system, a processor may detect the white base blob in the projected pattern, identify patches of the test pattern based on the base blob, identify the reference blobs in the patches and use the reference blobs to decode the colors of the additional blobs in the patch. Further, the test pattern may be arranged such that the colors of each of the additional blobs in the patch defines a patch address that allows the processor to locate the patch within the test pattern. Thus, the processor may use the location of the patch to accurately compare a target attribute (i.e., the input to the test pattern) and a detected attribute (i.e., as displayed on the surface) of a given blob, and compensate or apply a calibration parameter as appropriate.

Figure 1:
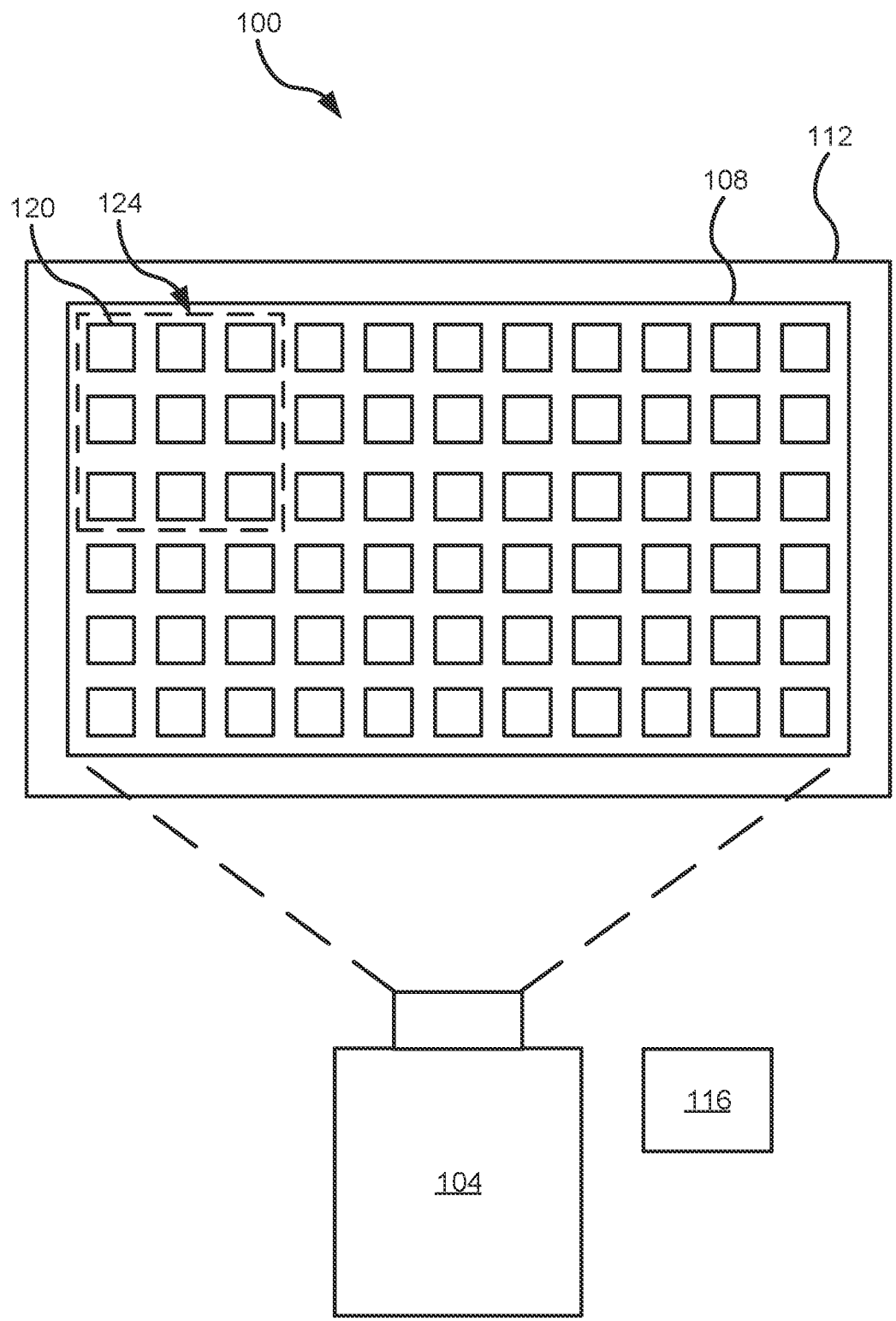
FIG. 1 depicts a block diagram of an example system for calibrating a display system.

FIG. 1 depicts a system 100 for calibrating a display system, such as a projector 104. The present example will be described in conjunction with the projector 104, however it will be understood that calibration of other suitable display systems and devices is also contemplated. The projector 104 is configured to project a test pattern 108 onto a surface 112. The system 100 may further include a camera 116 (e.g., an optical camera) to capture an image of the projected test pattern 108. The camera 116 may be a discrete component of the system 100, as shown, or the camera 116 may be integrated into the projector 104. The image of the projected test pattern 108 captured by the camera 116 may then be analyzed to identify calibration parameters for the projector 104 in order to calibrate the projector 104 with respect to the surface 112. For example, the calibration parameters may be to adjust the color, luminance, geometric alignment, distortion, color convergence, focus, or the like, to allow the projector 104 to subsequently project other images or videos with high clarity, contrast, and appropriate color onto the surface 112.

Accordingly, the test pattern 108 includes features to facilitate the calibration of the projector 104 with respect to color, luminance, geometric alignment, distortion, focus, color convergence, and the like. The test pattern 108 may further allow the projector 104 to be calibrated for focus and exposure. In particular, the test pattern 108 is formed of a plurality of blobs 120, each of which is a region of a given color. The blobs 120 may be squares, circles, other geometric shapes, or other suitable forms. Further, each of the blobs 120 may have the same form as the other blobs 120, or the blobs 120 may have different forms. The blobs 120 of the test pattern 108 may be organized to form patches 124. Each patch 124 includes a subset of the blobs 120 and has certain properties for use in the calibration of the projector 104, as will be further described below.

Figure 2:
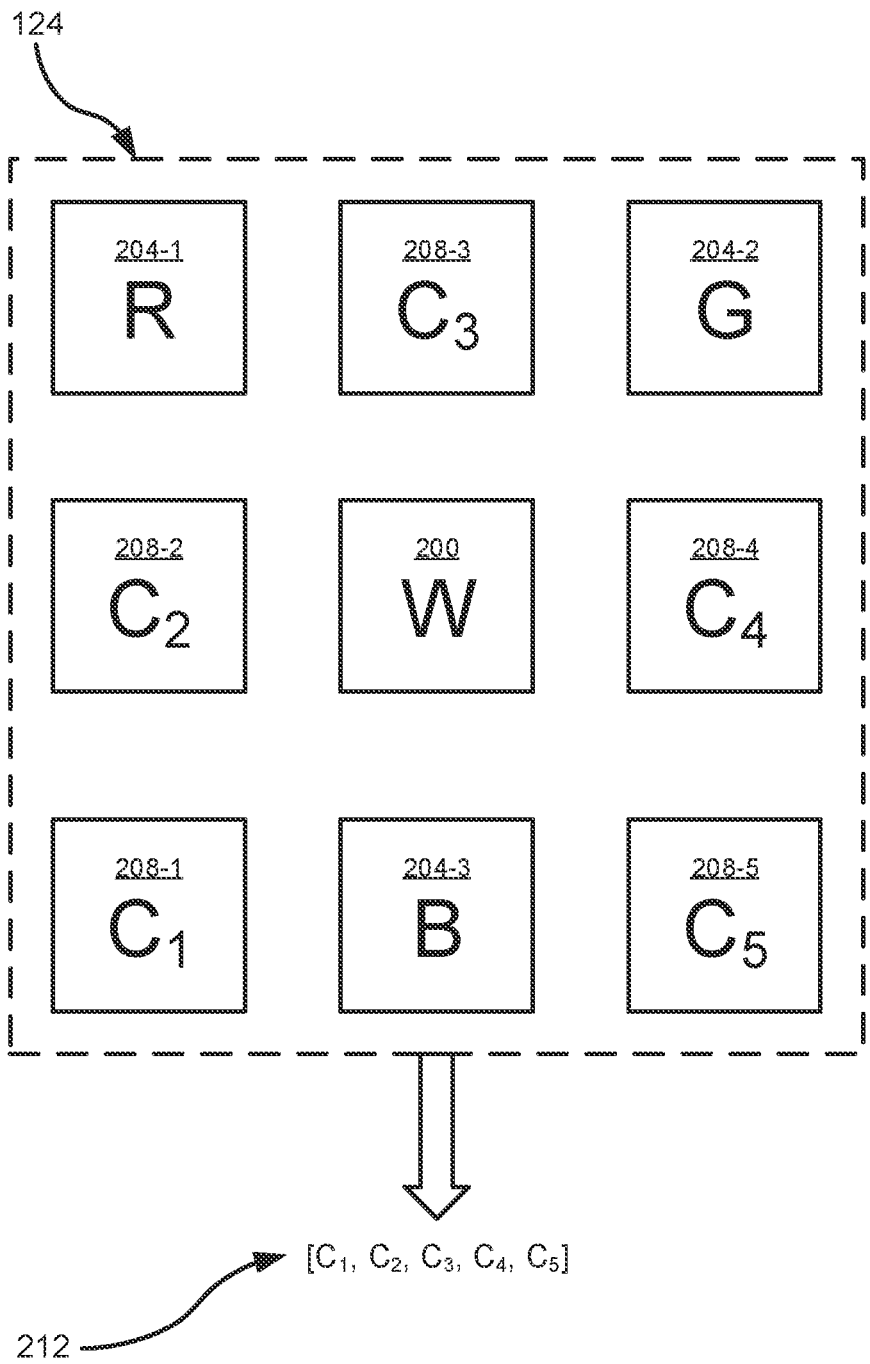
FIG. 2 depicts a schematic diagram of an example patch of a test pattern for calibrating a display system.

For example, referring to FIG. 2, an example patch 124 is depicted. In the present example, the patch 124 includes nine blobs 120, arranged in a three-by-three grid. In particular, the nine blobs 120 include a base blob 200, three reference blobs 204-1, 204-2, 204-3 (referred to herein generically as a reference blob 204 or collectively as reference blobs 204; this nomenclature is also used elsewhere herein), and five additional blobs 208-1, 208-2, 208-3, 208-4, 208-5.

The base blob 200 is a blob which may be used to identify the patch 124 from the detected blobs from the projected test pattern 108. In particular, the blobs 120 forming the patch 124 have a certain predefined spatial relationship to the base blob 200. For example, given the base blob 200, the patch 124 may be defined as the base blob 200 and the eight nearest neighbor blobs to the base blob 200 (i.e., the four blobs directly adjacent to the base blob 200 and the four blobs diagonally adjacent to the base blob 200, such that the base blob 200 is in the center of the three-by-three array of blobs). That is, each patch 124 may include a base blob 200 at the center of the patch 124. In other examples, other spatial relationships of the base blob 200 and the patch 124 are contemplated.

Accordingly, since the base blob 200 is used to identify the patch 124, the base blob 200 may be selected to have a distinctive color or other feature detectable in the projected test pattern 108, and consistently distinguishable from the other blobs 120 in the test pattern 108. In the present example, the base blob 200 is white in color, and hence will be the brightest or most intense detected blob, in particular amongst its eight nearest neighbors. In other examples, the base blob 200 may have a distinct shape, or may be additionally distinguished based on the surrounding blobs.

The reference blobs 204 are blobs in the patch which may be used as points of reference to orient the patch 124 and/or as color reference to enable color calibration of the projector 104, particularly on adverse surfaces, or for other reference purposes for further calibrating the projector 104. In the present example, the first reference blob 204-1 is located in the top left corner of the three-by-three array of blobs in the patch 124, the second reference blob 204-2 is located in the top right corner of the three-by-three array of blobs in the patch 124, and the third reference blob 204-3 is located at the bottom center of the three-by-three array of blobs in the patch 124. Further, in the present example, the first reference blob 204-1 is a red blob, the second reference blob 204-2 is a green blob, and the third reference blob 204-3 is a blue blob. In other examples, the reference blobs 204 may be selected to have other distinguishable colors or features. The combination of the designated locations and colors of each of the reference blobs 204 causes the patch 124 to be rotationally and reflectively asymmetric, and hence the reference blobs 204 may be used, for example, to determine the orientation of the test pattern (i.e., since the red reference blob 204-1 is in the top left corner, relative to the white blob 200, etc.), as well as whether the projector 104 is a front projector or a rear projector.

Further, since the reference blobs 204 in the present example cover the three primary colors of red, green and blue, the reference blobs 204 may be used as references for color identification and correction. In particular, the red, green and blue reference blobs 204 may be assumed to be the closest in hue to the original red, green and blue colors, and only suffer from intensity issues. Accordingly, their appearance on the surface 112 may be used as a reference for the appearance of other colors with red, green, and blue hues on the surface 112.

The five additional blobs 208 are other blobs which define a patch address 212 for the patch 124. For example, the five additional blobs 208 may be colored or greyscale blobs. Preferably, the colors of the additional blobs 208 may be selected from a predefined list of blob colors. The blob colors may be, for example, the secondary and tertiary colors. Based on the spatial relationships of the additional blobs 208 to the reference blobs 204, the additional blobs 208 may be ordered to form an ordered list. For example, in the present example, the additional blob 208-1 adjacent the blue reference blob 204-3 and in the same column as the red reference blob 204-1 is designated as the first additional blob 208-1. The remaining additional blobs 208 may be sequentially ordered by moving clockwise (i.e., towards the red reference blob 204-1 and away from the blue reference blob 204-3) through the additional blobs 208 to achieve an ordered list. The colors, $C_1$, $C_2$, $C_3$, $C_4$, and $C_5$ of the additional blobs 208 in their given order define the patch address 212. In other examples, other pre-defined orders of the color blobs, as defined relative to the base blob 200 and the reference blobs 294, including other sufficiently large subsets of the color blobs to uniquely identify the patch 124, are also contemplated.

It will be appreciated that in other examples, the patch 124 may include a different number of blobs 120, different configurations of the blobs 120, different colors or properties for the base blob 200 and the reference blobs 204, and the like. For example, the patch 124 could be an array of a different size, hexagonally tiled, or use an arrangement other than the base blob 200 and the three reference blobs 204. Additionally, in some examples, the patch 124 need not include the base blob 200 and/or the three reference blobs 204 and may instead be identifiable based on another arrangement and/or relationship between the blobs 120 forming the patch 124.

Figure 3:
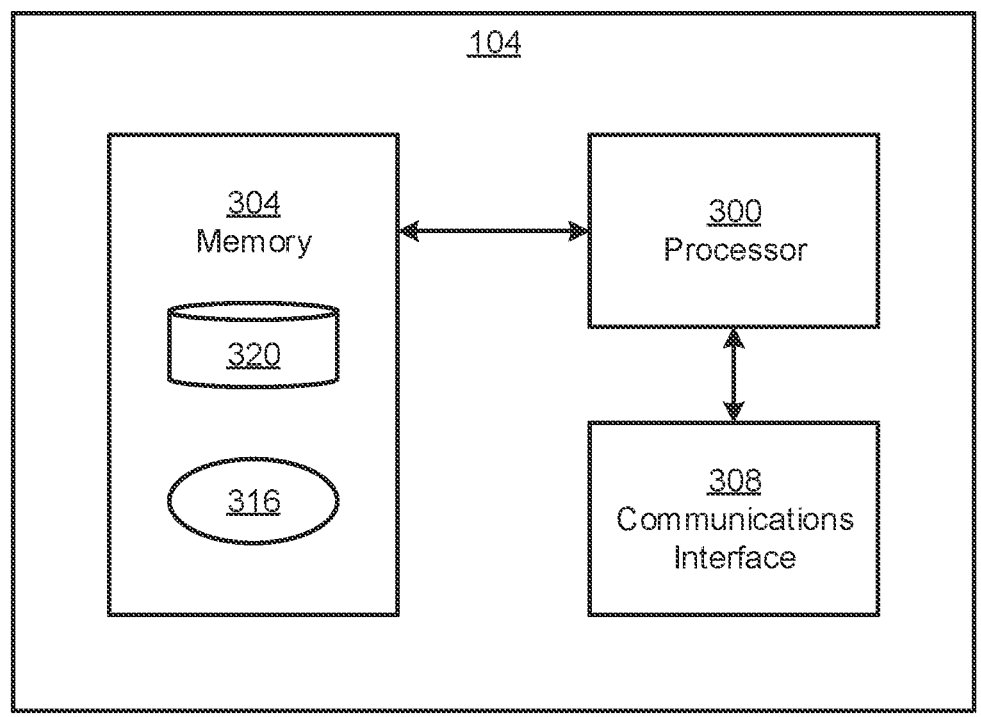
FIG. 3 depicts a block diagram of certain internal components of the projector of FIG. 1.

Referring to FIG. 3, certain internal components of the projector 104 are depicted in greater detail. The projector 104 includes a controller 300 and a memory 304. The projector 104 may further include a communications interface 308 and optionally, an input/output device (not shown).

The controller 300 may be a processor such as a central processing unit (CPU), a microcontroller, a processing core, or similar. The controller 300 may include multiple cooperating processors. In some examples, the functionality implemented by the controller 300 may be implemented by one or more specially designated hardware and firmware components, such as a field-programmable gate array (FPGA), an application-specific integrated circuit (ASIC), a graphics processing unit (GPU), or the like. In some examples, the controller 300 may be a special purpose processor which may be implemented via the dedicated logic circuitry of an ASIC or FPGA to enhance the processing speed of the calibration operation discussed herein.

The controller 300 is interconnected with a non-transitory computer-readable storage medium, such as the memory 304. The memory 304 may include a combination of volatile memory (e.g., random access memory or RAM), and non-volatile memory (e.g., read only memory or ROM, electrically erasable programmable read only memory or EEPROM, flash memory). The controller 300 and the memory 304 may comprise one or more integrated circuits. Some or all of the memory 304 may be integrated with the controller 300.

The memory 304 stores a calibration application 316 which, when executed by the controller 300, configures the controller 300 and/or the projector 104 to perform the various functions discussed below in greater detail and related to the calibration operation of the projector 104. In other examples, the application 316 may be implemented as a suite of distinct applications. The memory 304 also stores a repository 320 configured to store calibration data for the calibration operation, including a list of blob colors used in the test pattern, a list of valid addresses used in the test pattern, a list of hyper-addresses used in the test pattern, and other rules and data for use in the calibration operation of the projector 104.

The communications interface 308 is interconnected with the controller 300 and includes suitable hardware (e.g., transmitters, receivers, network interface controllers and the like) allowing the projector 104 to communicate with other computing devices. The specific components of the communications interface 308 are selected based on the type of network or other links that the projector 104 is to communicate over. For example, the communications interface 308 may allow the projector 104 to receive images of the projected test pattern from the camera 116, in examples where the camera 116 is not integrated with the projector 104.

Figure 4:
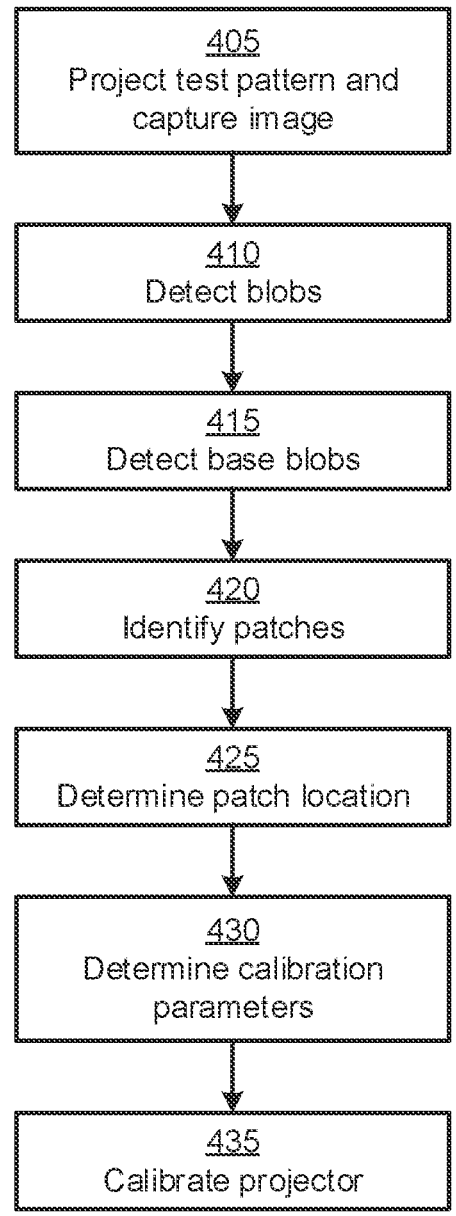
FIG. 4 depicts a flowchart of an example method of calibrating a display system.

The operation of the system 100 will now be described in greater detail with reference to FIG. 4. FIG. 4 depicts a flowchart of an example method 400 of calibrating a projector. The method 400 will be described in conjunction with its performance in the system 100, and in particular via execution of the application 316 by the processor 300, with reference to the components illustrated in FIGS. 1-3. In other examples, some or all of the method 400 may be performed by other suitable devices, such as a media server, or the like, or in other suitable systems.

At block 405, the projector 104 projects the test pattern 108 onto the surface 112 and the camera 116 captures an image of the test pattern 108 as projected onto the surface 112. In particular the image captured by the camera 116 represents the appearance of the test pattern 108 on the surface 112, including any geometric deformation, color distortion, and the like, which appear as a result of the properties of the surface 112. Additionally, at block 405, in examples where the camera 116 is distinct from the projector 104, the camera 116 may transmit the captured image to the projector 104 for further processing, and in particular to allow the processor 300 to compute calibration parameters for the projector 104. In further examples, rather than computing the calibration parameters at the projector 104, the calibration parameters may be computed at a separate computing device, such as a connected laptop or desktop computer, a server, or the like. Accordingly, in such examples, the camera 116 may transmit the captured image to the given computing device to compute the calibration parameters for the projector 104.

At block 410, the processor 300 analyzes the captured image to detect the blobs 120 of the test pattern 108. The blobs 120 may be detected using standard computer vision techniques, using convolution, differential methods, local extrema, or the like.

Figure 5:
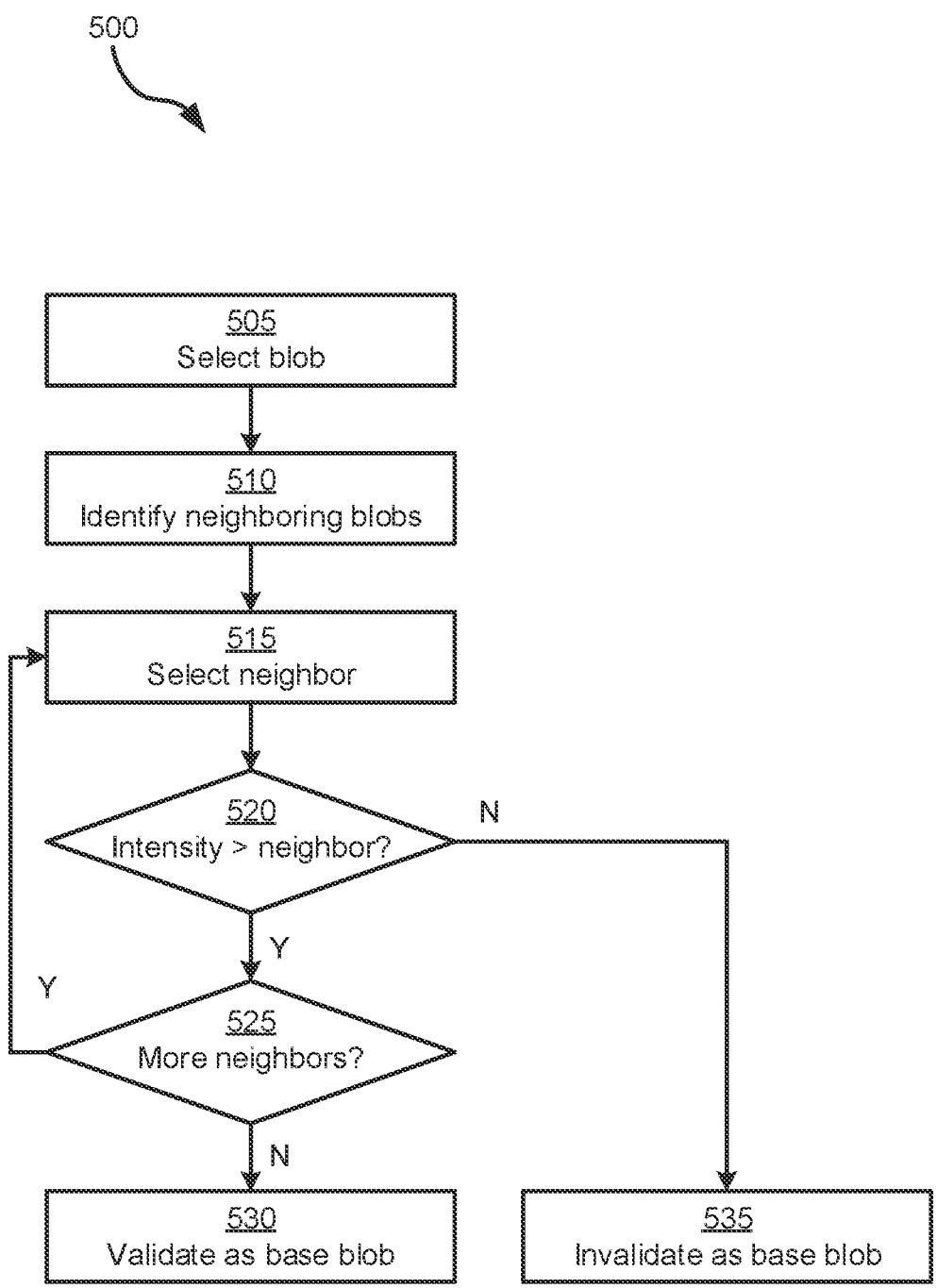
FIG. 5 depicts a flowchart of an example method of detecting base blobs at block 415 of the method of FIG. 4.

At block 415, the processor 300 detects one or more base blobs in the projected test pattern 108. In particular, the processor 300 may identify, from the blobs 120 detected at block 410, which blobs 120 satisfy the criteria of the base blobs and designate a subset of the blobs 120 as base blobs. For example, referring to FIG. 5, an example method 500 of identifying base blobs from the projected test pattern 108 is depicted. In particular, the method 500 will be described in conjunction with identifying base blobs in the test pattern 108 having patches 124, in particular, organized in the manner described in conjunction with FIG. 2. It will be understood that in other examples where the base blobs has other identifying characteristics (e.g., shape), other methods of identifying the base blob are contemplated.

At block 505, the processor 300 selects a blob 120 to analyze to determine whether or not it is a base blob. Accordingly, the processor 300 may select a blob 120 detected at block 410 which has not been validated as a base blob or invalidated as a base blob.

At block 510, the processor 300 identifies neighboring blobs 120 of the blob 120 selected at block 505. For example, when the base blobs are located in the center of a patch 124, the processor 300 may retrieve the eight nearest neighbors of the selected blob 120. Preferably, the test pattern 108 may be arranged such that adjacent blobs 120 are spaced apart by a predefined amount. For example, the space between adjacent blobs 120 may be about half the width of a blob 120. Accordingly, the processor 300 may look for blobs 120 detected at block 410 which are within 2.5 widths of the selected blob 120 to identify the neighbors of the selected blob 120.

At block 515, the processor 300 selects one of the neighbors identified at block 510 for comparison against the blob 120 selected at block 505. In particular, the processor 300 may select a neighboring blob 120 which has not yet been compared to the selected blob.

At block 520, the processor 300 compares the intensity of the selected neighboring blob 120 to the selected blob 120. For example, the processor 300 may sum the red, green and blue (RGB) components of the selected neighboring blob 120 and the selected blob 120 and compare the two sums. To obtain the RGB component values, the processor 300 may sample RGB components of the given blob 120 at its center, at a predefined set of coordinates within the blob 120, or the processor 300 may average the RGB components over the blob 120, or other suitable methods of obtaining RGB component values over the blob 120. In particular, since the base blobs in the present example are white in color, the processor 300 may determine whether the intensity (i.e., the sum of the RGB components) of the selected blob 120 is greater than the intensity of the selected neighboring blob 120.

If the decision at block 520 is negative, that is that the intensity of the selected blob 120 is not greater than the intensity of the selected neighboring blob 120, then the processor 300 proceeds to block 535. At block 535, the processor 300 invalidates the blob 120 selected at block 505 as a potential base blob. That is, since there is at least one neighboring blob 120 which is more intense than the selected blob 120, the processor 300 may deduce that the selected blob 120 is not a white blob, since neighboring blobs 120 are likely to suffer from similar color distortions, and hence the white blobs would remain more intense than their neighbors. Accordingly, the processor 300 may conclude that the selected blob 120 is not a base blob in the test pattern 108. The processor 300 may subsequently return to block 505 to continue selecting blobs 120 to identify the base blobs in the test pattern 108.

If the decision at block 520 is affirmative, that is that the intensity of the selected blob 120 is greater than the intensity of the selected neighboring blob 120, then the processor 300 proceeds to block 525. At block 525, the processor 300 may invalidate the neighboring blob 120 selected at block 515 as a base blob, since it has at least one neighboring blob 120 (namely, the selected blob 120) which is more intense than it. Further, the processor 300 determines whether or not the selected blob 120 has more neighboring blobs 120.

If the decision at block 525 is affirmative, that is, that the selected blob 120 has more neighboring blobs 120 against which its intensity has not yet been compared, the processor 300 returns to block 515 to select a further neighboring blob 120 to compare intensities.

If the decision at block 525 is negative, that is, that the selected blob 120 has no more neighboring blobs 120 against which its intensity has not yet been compared, the processor 300 proceeds to block 530. At block 530, the processor 300 validates the blob 120 selected at block 505 as a base blob. That is, having determined that the selected blob 120 has a higher intensity than each of its neighbors, the processor 300 may therefore determine that the selected blob 120 is white in color and therefore a base blob 200. The processor 300 may then return to block 505 to continue assessing blobs 120 to find the base blobs 200 in the test pattern 108.

Returning to FIG. 4, at block 420, after detecting the base blobs 200 in the test pattern 108, the processor 300 uses the base blobs 200 to identify the patches 124. For example, the processor 300 may define a patch 124 as a base blob 200 and the eight nearest neighboring blobs 120 of the base blob 200, for each base blob 200 identified at block 415.

In some examples, in addition to identifying base blobs 200 as being the most intense blobs amongst their eight nearest neighbors, the processor 300 may additionally verify a candidate blob as a base blob 200 based on the arrangement of the other blobs 120 within the patch 124 defined by the candidate blob. For example, the processor 300 may identify, within the patch 124, a red blob, a green blob, and a blue blob. In other examples, the processor 300 may select different color reference blobs. The processor 300 may additionally verify that the red, green and blue blobs are located in the patch 124 relative to the base blob 200 and to one another based on the predefined configurations of the patch 124. In some examples, if the red, green and blue blobs identified in the patch 124 do not satisfy the predefined configuration of the patch 124, the processor 300 may determine that the candidate white blob is not in fact a valid base blob 200.

In further examples, the processor 300 may omit block 415 entirely, and hence at block 420, may identify the patches solely on the basis of the blobs in the patch. Thus, for example, the processor may select a group of blobs in a sliding window (e.g., a 3×3 array, a 2×2 array, or otherwise selected based on the size and shape of an expected patch). The group of blobs may be compared against a list of valid patches, and the groups whose colors and positions match a valid patch may be identified as a patch. The processor 300 may reject groups of blobs which are made from partial groups of multiple patches. In particular, such an identification mechanism when each patch in the test pattern is unique.

Figure 6:
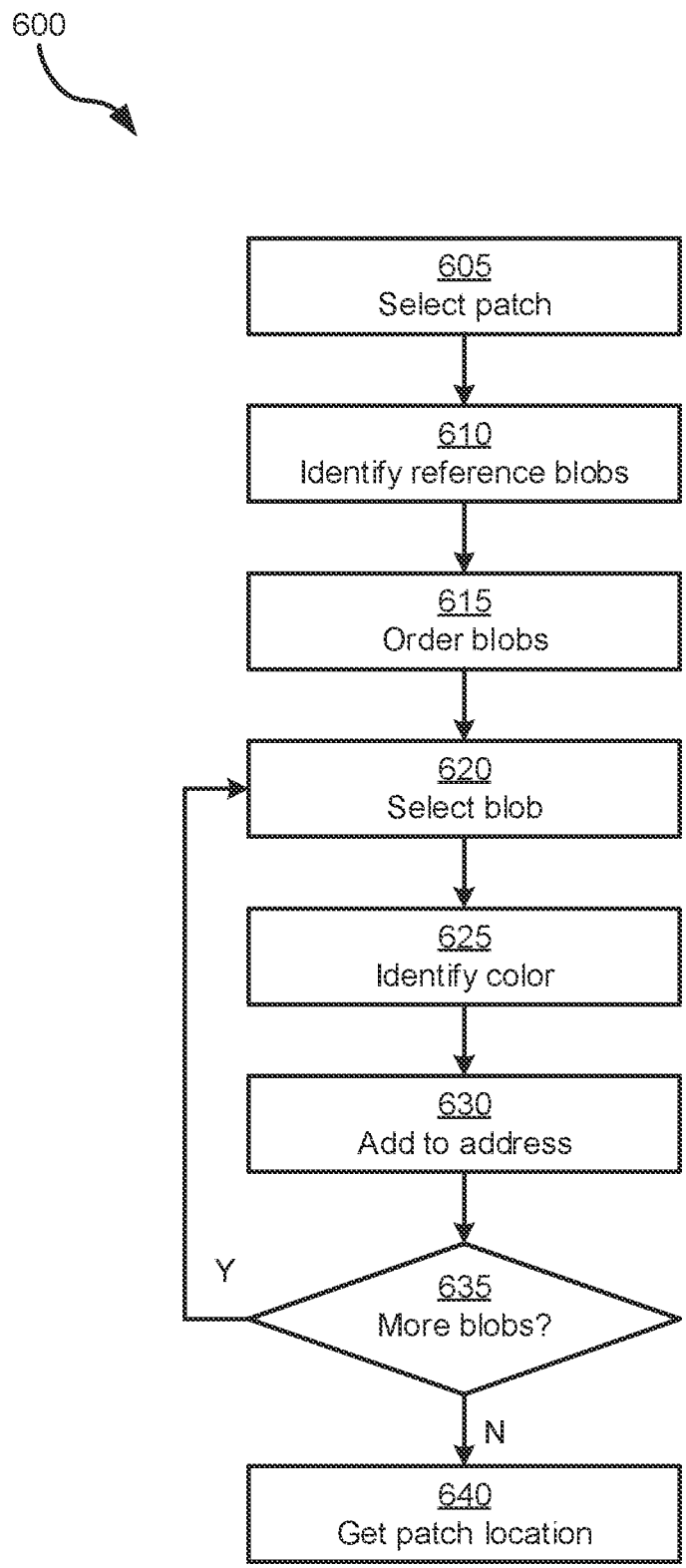
FIG. 6 depicts a flowchart of an example method of determining a patch location at block 425 of the method of FIG. 4.

At block 425, the processor 300 determines the patch location for at least one of the patches 124 identified at block 420. In some examples, the processor 300 may identify the patch location for all the patches 124 identified at block 420, while in other examples, the processor 300 may select a subset of patches 124 for which to identify the patch location. The subset may be selected, for example based on the spatial arrangement of the patches 124 (e.g., the location of each patch in an alternating or checkerboard pattern or the like) or other suitable selection criteria. The processor 300 may use the eight nearest neighboring blobs 120 in the patch 124 to determine the patch location based on predefined configurations and properties of each patch 124. Alternately, the processor 300 may use a suitable subset of blobs 120 in the patch 124 which uniquely identify the patch 124 and allow the patch 124 to be located in the test pattern. For example, referring to FIG. 6, a flowchart of an example method 600 of determining a patch location is depicted.

At block 605, the processor 300 selects a patch 124 to locate. In particular, the patch 124 may be selected based on its base blob 200.

At block 610, the processor 300 may identify the reference blobs 204 in the patch 124. For example, when the reference blobs 204 are red, green and blue blobs, the processor 300 may identify the reference blobs 204 by selecting the blobs 124 which have RGB components which are closest to a red hue, a green hue, and a blue hue, respectively. For example, the processor 300 may use a least-squares method, a cosine distance, or other suitable method to determine the distance of the color (i.e., based on its RGB components) of a given blob 120 to the RGB component values of a red blob. The blob 120 in the patch 124 which is closest to a red color may be determined by the processor 300 to be the red reference blob 204-1. Similarly, the processor 300 may identify the blobs 120 in the patch 124 which are closest to a green color and a blue color as the green reference blob 204-2 and the blue reference blob 204-3, respectively. Additionally, having identified the reference blobs 208, the processor 300 may also identify the remaining blobs 120 of the patch 124 as additional blobs 208.

At block 615, the processor 300 orders the additional blobs 208 into an ordered list. To do so, the processor 300 may first orient the patch 124 using the reference blobs 204. For example, the designated locations of the reference blobs 204 may cause the patch 124 to be rotationally and reflectively asymmetrical, and hence the processor 300 may use the red reference blob 208-1 to define the top left corner of the patch 124, and the green reference blob 208-2 to define the top right corner of the patch 124. The processor 300 may additionally confirm the orientation of the patch 124 by verifying that the blue reference blob 208-3 is in the bottom center.

Having oriented the patch 124, the processor 300 may sort the additional blobs 208 based on their location in the patch 124 to identify their position in the ordered list. In particular, since the patch 124 is oriented, the additional blob 208 in the bottom left corner may be designated as the first additional blob 208-1. The additional blobs 208 may then be added to the ordered list proceeding in a clockwise direction, from the first additional blob 208-1. Thus, the additional blob 208 immediately above the first additional blob 208-1 may be designated as the second additional blob 208-2. In particular, the ordered list as generated from a specific, predefined orientation of the patch 124 allows the additional blobs 208 to encode a patch address, without risk of duplicates based on using the same additional blobs 208 in a different order for a different patch 124. Thus, the ordered list of additional blobs 208 in the example patch 124 depicted in FIG. 2 is [208-1, 208-2, 208-3, 208-4, 208-5].

Having generated an ordered list of the additional blobs 208, the processor 300 may then determine the patch address 212 for the patch 124. In particular, at block 620, the processor 300 selects an additional blob 208 from the ordered list. The additional blob 208 may be the next additional blob 208 which has not yet been processed to generate the patch address 212. Thus, the processor 300 may begin with the first additional blob 208-1 at the first iteration of block 620.

At block 625, the processor 300 determines the color of the additional blob 208 selected at block 620. In particular, the processor 300 predicts the intended target color (i.e., the input color) of the selected additional blob 208. That is, rather than simply taking the color of the additional blob 208 as projected onto the surface 112, the processor 300 may use the RGB component values of the white base blob 200 and the red, green and blue reference blobs 204 to predict the input color for the selected additional blob 208. For example, if the blue component value of the additional blob 208 is similar to the blue component value of the blue reference blob 204-3, the processor 300 may predict that the input blue component value of the additional blob 208 is similar to the input blue component value of the blue reference blob 204-3, that is, 255. Similarly, the processor 300 may scale the other detected RGB component values of the additional blob 208 according to the detected RGB component values of the reference blobs 204 and the base blob 200 to predict the other input RGB component values of the additional blob and hence decode the input blob color of the additional blob. More specifically, the prediction may include scaling and/or adjusting the values of the detected blobs 208 to adjust for variations in background or ambient light to allow decoding of the input blob color to be more accurate.

In some examples, the processor 300 may additionally verify the predicted input color against a predefined list of blob colors used in the test pattern 108 stored in the memory 304. That is, rather than using combinations of any and/or all colors (i.e., all RGB component values), the test pattern 108 may contain blobs 120 with colors selected from the predefined list of blob colors. For example, the predefined list of blob colors may include the secondary and tertiary colors. In such examples, the processor 300 may verify the predicted input color and/or corrected the blob color by selecting a new predicted input color based on the closest blob color on the predefined list of blob colors. For example, the processor 300 may used a least-squares computation to determine the blob color on the predefined list of blob colors which is closest to the predicted input color and designate the closest blob color as the new predicted input color. In some examples, the processor 300 may only designate the closest blob color as the new predicted input color if the distance to the new predicted input color is below a threshold distance. Thus, if the predicted input color is mid-way between two possible valid blob colors, the processor 300 may defer prediction of the blob color for a more holistic verification of the patch 124, as described below.

At block 630, the processor 300 adds the predicted input color for the blob 208 selected at block 620 to the patch address to build the patch address 212. In particular, since the additional blobs 208 are processed in the ordered list, the patch address 212 is similarly ordered by the associated colors of the additional blobs 208 in the ordered list. Thus, the patch address 212 of the example patch 124 depicted in FIG. 2 is [$C_1, C_2, C_3, C_4, C_5$].

At block 635, the processor 300 determines whether there are any more additional blobs 208 in the ordered list.

If the decision at block 635 is affirmative, the processor 300 returns to block 620 to select the next additional blob 208 in the ordered list and add its associated color to the patch address 212.

If the decision at block 640 is negative, that is, that all the additional blobs 208 in the ordered list have been processed and their corresponding associated colors added to the patch address, then the processor 300 proceeds to block 640. At block 640, the processor 300 uses the patch address 212 to determine the patch location of the patch 124. For example, the processor 300 may retrieve, from the memory 304, a predefined look-up table or other suitable data structure which defines a patch location associated with each patch address 212. For example, the patch location may be the coordinates of the patch 124 within the test pattern 108. The patch location may be expressed, for example, in terms of pixel coordinates of a given corner of the patch 124 (e.g., the top left corner), pixel coordinates of a center of the patch 124, coordinates relative to other patches 124 (e.g., designating the top left patch as 0,0), or other suitable means. In other examples, the processor 300 may directly compute the patch location of the patch 124 based on the patch address 212 and a predefined set of rules for computing the patch location.

In some examples, prior to comparing the patch address 212 to the look-up table to determine the patch location, the processor 300 may additionally verify the patch address against a predefined list of valid patch addresses stored in the memory 304. The predefined list of valid patch addresses includes patch addresses 212 actually employed in the test pattern 108. That is, the list of valid patch addresses is generated based on the input colors to the test pattern 108. Accordingly, the test pattern 108 is preferably arranged such that each valid patch address appears only once on the list of valid patch addresses. The patch addresses may thus be uniquely verified, as well as used to uniquely locate the patch 124 within the test pattern 108. The processor 300 may perform verification of the patch address against the valid patch addresses, for example based on a full matching, a partial matching, a distance computation, or other suitable means. When the determined patch address is not a valid patch address, the processor 300 may correct the patch address based on the list of valid patch addresses and, for example, the closest partial matching.

Further, in some examples, additionally or alternately to verifying the blob color of each of the additional blobs 208 individually, the processor 300 may verify the patch address 212 against the predefined list of valid patch addresses stored in the memory 304 based, in part or in whole, on the predicted input colors of each of the additional blobs (i.e., as opposed to the blob colors as selected from the predefined list of blob colors). Thus, if a predicted input color of one of the additional blobs 208 is in between two (or more) possible blob colors on the predefined list, verification of the patch address 212 as a whole may allow the processor 300 to more accurately predict the correct blob color, particularly if one blob color corresponds with a valid patch address, while the other does not.

Figure 7:
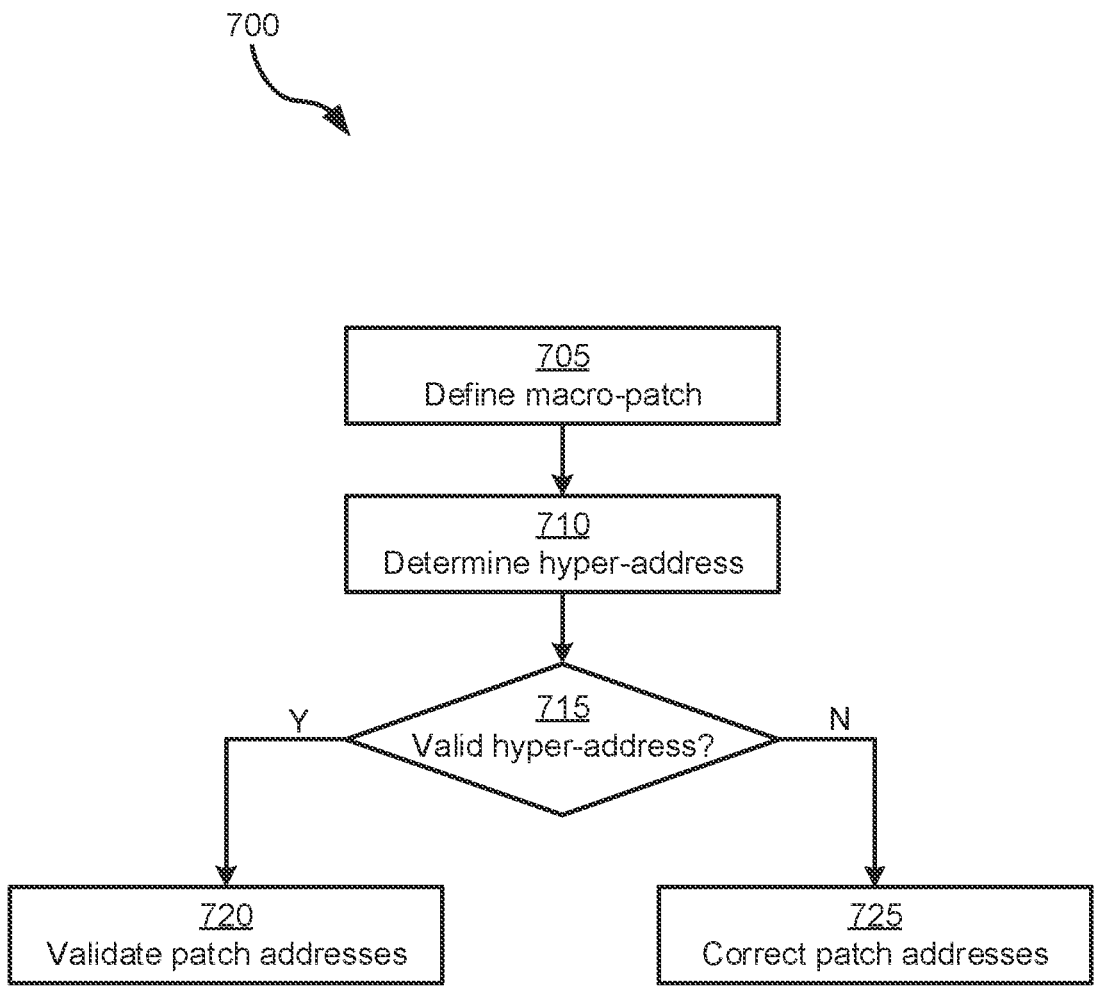
FIG. 7 depicts a flowchart of an example method of verifying a patch address using hyper-addressing.

After determining the patch address for a given patch 124, the processor 300 may return to block 605 to determine the patch address for another patch 124, until each patch 124 associated with each base blob 200 has been assigned a patch address. In some examples, after determining the patch addresses for each patch 124, the processor 300 may additionally validate the patch addresses by forming macro-patches and validating the hyper-addresses of each macro-patch. For example, FIG. 7 depicts a flowchart of an example method 700 of validating patch addresses.

At block 705, the processor 300 defines a macro-patch. The macro-patch may be an array or subset of the patches 124 in the test pattern 108. Preferably, the macro-patch has a predefined configuration, such as a two-by-two array, or other configuration in which the spatial relationship between patches 124 in the macro-patch is predetermined.

At block 710, the processor 300 determines a hyper-address for the macro-patch. The hyper-address includes respective patch addresses of the patches forming the macro-patch. In particular, the hyper-address for the macro-patch may be an ordered list of the patch addresses of the patches forming the macro-patch. Thus, to determine the hyper-address for the macro-patch, the processor 300 may first order the patches into an ordered list. Since each of the patches themselves have an orientation, the macro-patch may be oriented according to the orientations of the patches forming the macro-patch. The processor 300 may then select one of the patches as the first patch, according to a predefined criteria, and proceed to add patches to the list sequentially according to a predefined path between the patches of the macro-patch. The processor 300 may then define the ordered list of corresponding patch addresses of the patches to be the hyper-address.

Figure 8:
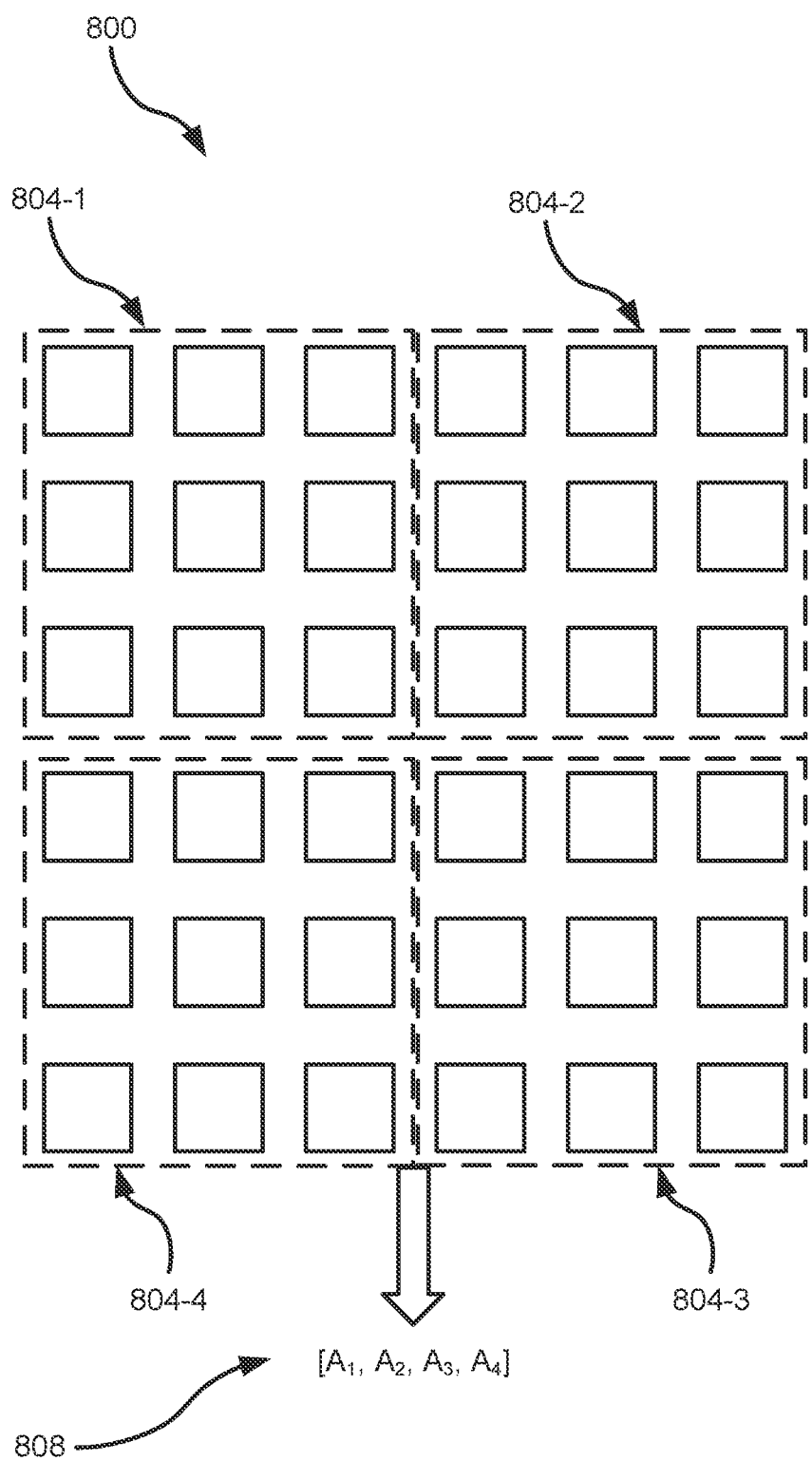
FIG. 8 depicts a schematic diagram of an example macro-patch of a test pattern for calibrating a display system.

For example, referring to FIG. 8, an example macro-patch 800 is depicted. The macro-patch 800 includes four patches, 804-1, 804-2, 804-3, and 804-4, arranged in a two-by-two array. In other examples, other arrangements of patches 804 in the macro-patch 800 are contemplated. For example, the macro-patch 800 may include a larger array of patches 804, a line of patches 804, or the like. Further, in some examples, different macro-patches may share one or more patches contained therein.

In the present example, each of the four patches 804 has a corresponding patch address, $A_1$, $A_2$, $A_3$, and $A_4$, respectively, defined by the blobs in the patch 804. To generate a hyper-address 808 for the macro-patch 800, the processor 300 generates an ordered list of the patches 804. In the present example, the processor 300 begins at the top left patch, 804-1, and proceeds clockwise through the patches 804 in the two-by-two array. Accordingly, the ordered list of patches is [804-1, 804-2, 804-3, 804-4]. The processor 300 may then generate a hyper-address 808 from the ordered list of patches 804 using the corresponding patch address for each patch 804 in the ordered list. Accordingly, the hyper-address 808 is [$A_1$, $A_2$, $A_3$, $A_4$].

Returning to FIG. 7, at block 715, the processor 300 determines whether the hyper-address generated at block 710 is a valid hyper-address. For example, the processor 300 may compare the hyper-address generated at block 710 to a predefined list of valid hyper-addresses stored in the memory 304. The predefined list of valid hyper-addresses includes hyper-addresses actually employed in the test pattern 108, based on the input colors and arrangement of blobs (and therefore patches) in the test pattern 108. In particular, the valid hyper-addresses are defined based on the predefined path through the patches in the macro-patch. The processor 300 may perform the verification of the hyper-addresses against the valid hyper-addresses based on a full matching, a partial matching, distance computation, or the like.

In examples where the test pattern 108 has unique patch addresses for each patch, the hyper-addresses for each macro-patch will similarly be unique. However, in examples where patch addresses are re-used for different patches at different locations in the test pattern 108, the test pattern 108 is preferably arranged such that the hyper-addresses for each macro-patch is unique. Uniqueness of the hyper-addresses would therefore still allow the patch addresses to be uniquely verified and located (i.e., based on its relationship to adjacent patches in a macro-patch) within the test pattern 108.

If the determination at block 715 is affirmative, the processor 300 proceeds to block 720. At block 720, the processor 300 validates each of the patch addresses which formed the hyper-address. That is, the processor 300 confirms that the patch addresses defined by the blobs in each of the patches, is in fact the correct patch address for that patch.

If the determination at block 720 is negative, that is, that the hyper-address is not a valid hyper-address, the processor 300 proceeds to block 725. At block 725, the processor 300 may make a prediction as to which hyper-address is the correct hyper-address for the macro-patch and may correct the patch addresses for the patches of the macro-patch, as appropriate. For example, if three patch addresses of the hyper-address match a valid hyper-address, and the fourth patch address is off by less than a threshold distance (e.g., as computed based on the differences in RGB components of the colors defining the patch address) of the fourth patch address of the valid hyper-address, then the processor 300 may determine that the fourth patch address should be the patch address defined in the valid hyper-address and may correct the fourth patch address accordingly.

As will be appreciated, other verification and matching scenarios and distance computations are also contemplated. Further, recursively grouping macro-patches and obtaining addresses for the grouped macro-patches may also allow for repetition of patch addresses and hyper-addresses and/or provide further confirmation or verification of the correct patch addresses and hyper-addresses.

Returning to FIG. 4, after determining the patch location at block 425, and optionally verifying the patch location, the processor 300 may subsequently use the patch location to determine a blob location for at least one detected blob 120 detected at block 410. In some examples, the processor 300 may determine a blob location for all the blobs 120 detected at block 410, while in other examples, the processor 300 may determine a blob location for a subset of the blobs 120 detected at block 410. The selection of the subset may be based, for example, on a spatial arrangement of the blobs 120 within the test pattern. That is, since each patch location is known, and since the blobs 120 are located at predetermined positions within its corresponding patch, the processor 300 may determine the blob location for each blob 120.

At block 430, the processor 300 determines a calibration parameter for the projector 104. In particular, the processor 300 uses the blob location and a detected attribute of at least one blob 210 which was detected at block 410 and located at block 425. Preferably, the processor 300 may determine the calibration parameter based on all of the blobs 210 in order to allow the calibration parameters to be better localized and more accurate across the test pattern and the projection area for the projector 104. For example, the calibration parameter may be a color or luminance of the projector 104. Generally, the processor 300 may use the blob location to determine the input parameters for a given blob 120 and compare the input parameters to the corresponding detected attributes (e.g., color, luminance, geometric alignment) and compute a correction to allow the projector 104 to project the given blob 120 such that the detected attribute better approximates the desired target parameter.

Figure 9:
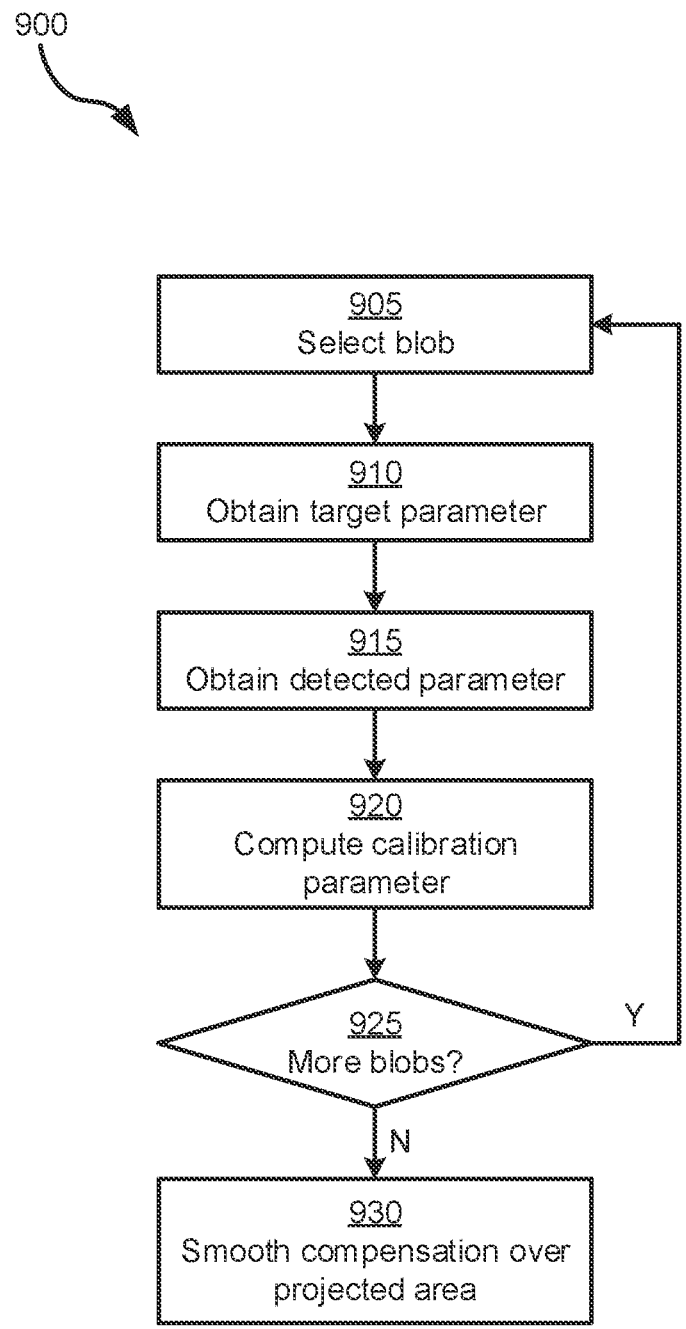
FIG. 9 depicts a flowchart of an example method of determining a calibration parameter at block 430 of the method of FIG. 4.

FIG. 9 depicts a flowchart of an example method 900 of determining calibration parameters for the projector 104.

At block 905, the processor 300 selects a blob 120 of the test pattern 108. In particular, the processor 300 may select a blob 120 for which a calibration parameter or compensation has not yet been computed.

At block 910, the processor 300 obtains the target attribute for the blob 120 selected at block 905. For example, the target attribute may be a target color or luminance, as defined by the input color or luminance of the blob 120 in the test pattern 108, or a geometric alignment, as defined by the geometric properties of the test pattern 108. That is, the processor 300 may use the blob location of the blob 120 within the test pattern 108 to identify the input attribute as the target attribute.

At block 915, the processor 300 obtains the detected attribute for the blob 120 selected at block 905. That is, the processor 300 identifies the corresponding color or luminance of the blob 120 as detected by the camera 116 in the captured image representing the test pattern 108 as projected onto the surface 112. In some examples, the detected attribute may be sampled at the center of the blob 120, or at a predefined point within the blob 120 (e.g., a predefined corner, etc.), while in other examples, the detected attribute may be an average of the detected attribute at each point, or a selected subset of points, across the blob 120.

At block 920, the processor 300 computes calibration parameters for the selected blob 120 based on the target attribute(s) determined at block 910 and the detected attribute(s) determined at block 915. That is, based on the differences between the input to the projector 104 and the detected output of the projection onto the surface 112, the processor 300 may determine a compensation to adjust the input to the projector 104 to allow the detected output attribute (i.e., as projected onto the surface 112) to better approximate the target attribute. For example, the processor 300 may use standard radiometric or luminance compensation computations and/or geometric alignment computations, as will be understood by those of skill in the art, to define the calibration parameters for the blob 120.

At block 925, the processor 300 determines whether there are any further blobs 120 in the test pattern 108 for which the calibration parameters have not yet been computed. If the determination at block 925 is affirmative, the processor 300 returns to block 905 to select a subsequent blob 120 for which the calibration parameters have not yet been computed.

If the determination at block 925 is negative, that is that the calibration parameters have been computed for each blob 120 in the test pattern 108, then the processor 300 proceeds to block 930. At block 930, the processor 300 smooths the calibration parameters of each of the blobs 120 over the projection area (i.e., over the area of the test pattern 108). In particular, the calibration parameters computed at block 920 are individually computed per blob 120. Accordingly, adjacent blobs 120 may have different calibration parameters, which may cause abrupt and jarring changes between blobs 120 in the projection if applied per blob 120. Further, since the blobs 120 may be spaced apart from one another, the test pattern 108 may not produce a calibration parameter for the negative spaces between blobs 120. Accordingly, rather than simply directly applying the calibration parameter over the blob area of the given blob 120, the processor 300 may designate the calibration parameter at a given point of the blob 120 (e.g., the calibration parameter applies at the center of the blob 120) for each of the blobs 120 in the test pattern 108 and apply a smoothing function to generate calibration parameters for the intermediary points between the given points of the blobs 120.

Returning to FIG. 4, after determining the calibration parameters for the projector 104, the processor 300 proceeds to block 435. At block 435, the processor 300 applies the calibration parameters to calibrate the projector 104. That is, during a subsequent projection operation, the processor 300 may receive input data representing an image or video to be projected by the projector 104, apply the calibration parameters to the input data to generate calibrated input data, and control the light sources of the projector 104 to project the image or video in accordance with the calibrated input data. In other examples, the application of the calibration parameters may be applied to the input data to generate calibrated input data prior to being received at the projector 104 and/or the processor 300. Thus, the projector 104 will project the image or video with the color, luminance, geometric alignment and/or other attributes adjusted to compensate for variations and imperfections in the surface 112 to allow the projection to better approximate the original input data.

It will be appreciated that variations on the above method are also contemplated. For example, if a sufficient number of colors are employed, and/or if the test pattern includes sufficiently few blobs and/or patches, the patch addresses may be encoded simply based on the colors of the additional blobs in the patch, rather than based on an ordered list of the colors of the additional blobs in the patch.

In some examples, rather than employing color blobs, the test pattern may include greyscale blobs including a predefined number of grey levels (e.g., 3 grey levels). In such examples, the grey blobs surrounding the white base blob may still encode the patch address, based on unique (unordered) combinations of the eight greyscale blobs. Such a test pattern may be advantageous, for example for applying only a luminance correction when a radiometric color compensation has already been performed against another projector.

Figure 10:
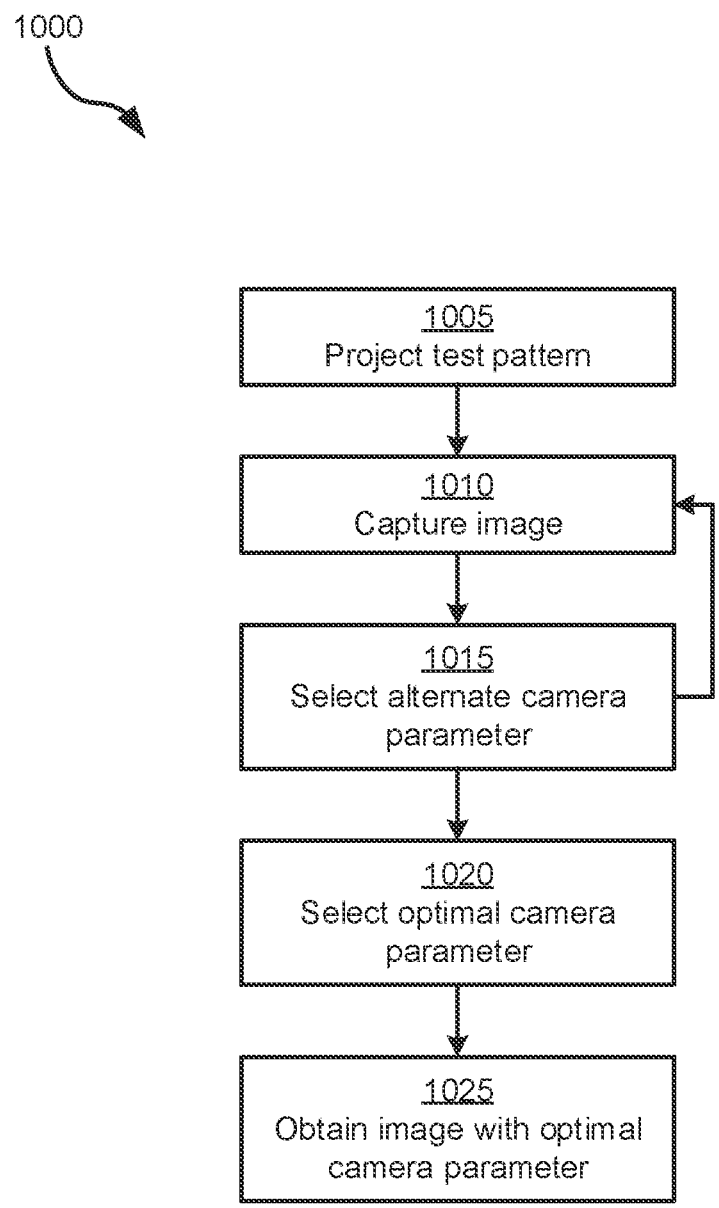
FIG. 10 depicts a flowchart of an example method of adjusting a camera parameter.

In some examples, in order to best detect the blobs 120 and obtain a most accurate representation of the projected test pattern, the camera 116 may additionally include an automatic exposure and/or focus adjustment capabilities. For example, referring to FIG. 10, a flowchart of an example method 1000 of automatically adjusting camera parameters is depicted.

At block 1005, the projector 104 projects a test pattern, such as the test pattern 108.

At block 1010, the camera 116 captures an image of the test pattern, at a first camera parameter. For example, the camera 116 may select a first exposure and/or a first focus at which to capture the image.

At block 1015, the camera 116 selects a new camera parameter. For example, the camera 116 may select a different exposure and/or focus at which to capture a subsequent image. The camera parameter may be selected for example from a predefined list of camera parameters to test. Preferably, the camera 116 may only adjust one camera parameter at a time to better control the variables (i.e., only changing exposure or focus, but not both).

The camera 116 may then return to block 1010 to capture a subsequent image of the test pattern 108 at the new camera parameter.

If each of the camera parameters in the predefined list has been tested, the method 1000 proceeds to block 1020. At block 1020, the camera 116 and/or the processor 300 and/or another suitable computing device selects an optimal camera parameter.

For example, the focus may be computed by using a mean-squared gradient (MSG) technique to compute the strength of the edges within the test pattern. Advantageously, the test pattern 108 may include blobs 120 with high contrast at all edges with the negative space between the blobs 120, as based on the selection of primary, secondary, and tertiary colors of the blobs 120. Accordingly, the focus of the camera 116 may be automatically selected based on the focus with the highest MSG.

The exposure of the camera 116 may be computed based on the RGB component values. In particular, since the test pattern 108 includes white blobs, the optimal exposure of the camera 116 may be selected based on the RGB component values of the white blobs. For example, the target or optimal exposure may result in RGB component values of the white blobs within a range of 245 to 255. In other examples, other ranges of acceptable RGB component values for the white blobs may be used.

At block 1025, after having selected the optimal camera parameters, the camera 116 and/or the processor 300 may obtain an image under the selected optimal camera parameters. In some examples, when the camera 116 has already captured an image of the test pattern under the selected optimal camera parameters, said image may simply be retrieved. In other examples, the camera 116 may capture a new image of the test pattern under the selected optimal camera parameters. The camera 116 may therefore capture at least one image with optimized focus, exposure and/or other camera parameters. For example, the method 1000 may be performed during block 405 of the method 400 to allow the image with optimized focus and exposure to be used for the remainder of the calibration procedure.

In other examples, the test pattern may include other features to optimize camera exposure. For example, the test pattern may include varying intensities of white (e.g., within a single blob, the outer edge may have 100% intensity while the center of the blob has 10% intensity, different blobs may have different intensities, the test pattern may include a 0 to 100% ramp-shaded region, or the like). The exposure of the camera may then be computed based on the relative number of 100% intense pixels, and/or the actual intensity of a designated exposure value (e.g., if the middle of the ramp-shaded region is supposed to be 50% intensity, and it is either higher or lower intensity, the corresponding exposure of the camera may be computed), or similar.

Figure 11:
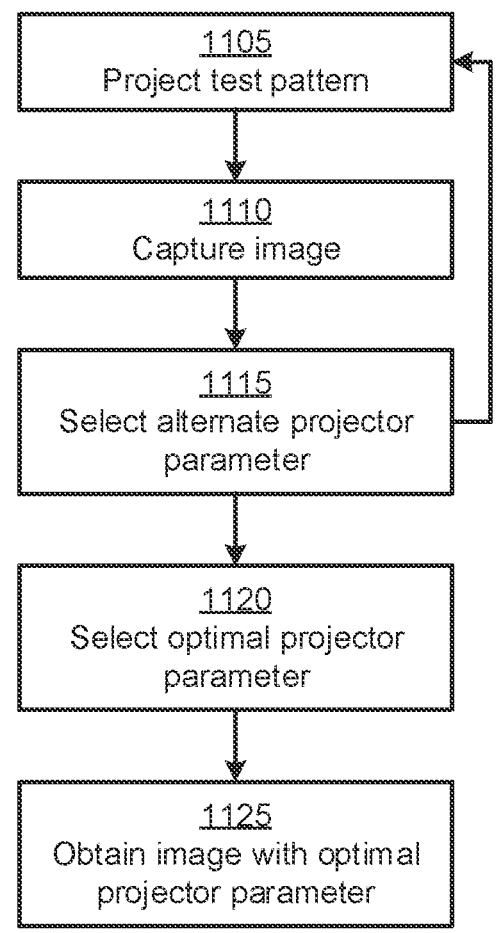
FIG. 11 depicts a flowchart of an example method of adjusting a display system parameter.

In some examples, in addition to optimizing the camera parameter(s), the system 100 may additionally optimize the focus and/or other parameters of the projector 104. For example, FIG. 11 a flowchart of an example method 110 of automatically adjusting the focus of a projector or display system is depicted.

At block 1105, the projector 104 projects a test pattern, such as the test pattern 108, at a first focus. For example, the projector 104 may select a first focus at which to project the test pattern.

At block 1110, the camera 116 captures an image of the test pattern.

At block 1115, the projector 104 selects a new focus and/or other projector parameter. For example, the projector 104 may select a different focus at which to project the test pattern. The focus and/or other projector parameter may be selected from a predefined list of projector parameters to test. Preferably, the projector 104 may only adjust one projector parameter at a time, if multiple projector parameters are being tested.

The projector 104 may then return to block 1105 to project the test pattern at the new projector parameter.

If each of the projector parameters or focus levels in the predefined list has been tested, the method 1100 proceeds to block 1120. At block 1120, the projector 104 and/or another suitable computing device selects an optimal focus and/or other projector parameter. For example, the focus of the projector may similarly be computed using the MSG to determine the strength of the edges within the test pattern. As will be appreciated, the test pattern 108 provides high contrast edges to allow the focus of the projector 104 to be similarly optimized.

At block 1125, after having selected the optimal focus and/or other projector parameter, the camera 116 and/or the processor 300 may obtain an image with the selected optimal focus and/or projector parameter, for example, by retrieving such an image if it has already been captured, or by projecting, using the projector 104, the test pattern with the optimal focus and/or other projected parameter, and capturing another image. The method 1100 may similarly be performed during block 405 of the method 400 to allow the image used for the remainder of the calibration procedure to be optimized for projector focus. In other examples, the method 1100 may be performed after performance of the method 400, since the projector focus may not materially affect the determination of the calibration parameters as much.

As described above, an example system and method of calibrating projectors employs a test pattern which is organized into patches including a white blob, and red, green and blue blobs to allow calibration parameters, including radiometric or color compensation, luminance correction, and spatial alignment to be computed by projecting a single test pattern. In particular, in order to do so, the colors of the additional blobs in each patch define a patch address that allows the patch to be located within the test pattern. The location of each patch may then be used to compare the target attribute based on the input at the given location, with the detected attribute, to compute calibration parameters to calibrate the projector and allow the projector to compensate the projected image according to the target surface on which an image or video is projected.

The scope of the claims should not be limited by the embodiments set forth in the above examples, but should be given the broadest interpretation consistent with the description as a whole.

The invention claimed is:

1. A method of calibrating a display system, the method comprising:
   displaying a test pattern including a plurality of blobs;
   detecting one or more base blobs in the displayed test pattern;
   identifying, based on the detected base blobs, patches of the test pattern, wherein each patch comprises one of the base blobs and a subset of additional blobs detected in the displayed test pattern;
   determining a patch location for at least one patch within the test pattern based on the subset of the additional blobs in the patch to determine a blob location for at least one detected blob;
   determining a calibration parameter for the display system based on the blob location and a detected attribute of the at least one detected blob; and
   calibrating the display system using the calibration parameter.

2. The method of claim 1, wherein detecting the one or more base blobs comprises detecting white blobs in the plurality of blobs.

3. The method of claim 1, wherein each patch comprises the one base blob and its eight nearest neighbors.

4. The method of claim 1, wherein determining the patch location comprises:
   determining a blob color for each blob in the patch;
   defining a patch address for the patch based on the blob color of each blob in the patch; and
   determining the patch location within the test pattern associated with the patch address.

5. The method of claim 4, further comprising identifying, from the subset of additional blobs, at least one reference blob.

6. The method of claim 5, wherein identifying the at least one reference blob comprises identifying a red reference blob, a green reference blob and a blue reference blob.

7. The method of claim 6, wherein determining the blob color for each blob in the patch comprises predicting an input color of each blob based on red green blue component values of the red reference blob, the green reference blob, and the blue reference blob.

8. The method of claim 5, further comprising ordering each additional blob in the patch based on its spatial relationship within the patch to the at least one reference blob to generate an ordered list of blob colors; and
   wherein the patch address is defined based on the ordered list of blob colors.

9. The method of claim 4, further comprising verifying the blob color against a predefined list of blob colors used in the test pattern.

10. The method of claim 9, further comprising: when the blob color is not a valid blob color, correcting the blob color based on the predefined list of blob colors.

11. The method of claim 4, further comprising verifying the patch address against a predefined list of valid patch addresses.

12. The method of claim 11, further comprising: when the patch address is not a valid patch address, correcting the patch address based on the list of valid patch addresses.

13. The method of claim 4, wherein determining the patch location comprises retrieving the patch location from a look-up table defining the patch location associated with the patch address.

14. The method of claim 1, further comprising:
   defining a macro-patch comprising two or more patches of the test pattern;
   determining a hyper-address for the macro-patch, the hyper-addresses including respective patch addresses of the two or more patches forming the hyper-address; and
   verifying the hyper-address against a predefined list of valid hyper-addresses.

15. The method of claim 14, further comprising: when the hyper-address is not a valid hyper-address, determining a correct hyper-address and correcting at least one of the respective patch addresses of the hyper-address.

16. The method of claim 1, wherein determining the calibration parameters comprises:
   obtaining a target attribute for each detected blob based on the blob location of the blob in the test pattern; and
   defining the calibration parameters based on the difference between the detected attribute and the target attribute.

17. The method of claim 1, wherein the calibration parameters comprise one or more of: color, luminance, geometric alignment, distortion, focus, and color convergence.

18. A system comprising:
   a display system configured to project a test pattern onto a surface, the test pattern including a plurality of blobs;
   a camera configured to capture an image of at least a portion of the projected test pattern; and
   a processor configured to:
      detect one or more base blobs in the test pattern;
      identify, based on the detected base blobs, a patch of the test pattern, wherein the patch comprises one of the base blobs and a subset of additional blobs detected in the test pattern;
      determine a patch location for the patch within the test pattern based on the subset of the additional blobs in the patch to determine a blob location for at least one detected blob;
      determine a calibration parameter for the display system based on the blob location and a detected attribute of the at least one detected blob; and
      calibrate the display system using the calibration parameter.

19. The system of claim 18, wherein the processor is further configured to:
   determine a blob color for each blob in the patch;
   define a patch address for the patch based on the blob color of each blob in the patch; and
   determine the patch location within the test pattern associated with the patch address.

20. The system of claim 18, wherein the camera is integrated with the projector.

21. A method of calibrating a display system, the method comprising:
   projecting a test pattern including a plurality of blobs;
   identifying patches of the test pattern, wherein each patch comprises a subset of blobs detected in the projected test pattern;
   determining a patch location for at least one patch within the test pattern based on the blobs in the patch;
   determining a blob location for each at least one detected blob in the patch based on the patch location;
   determining a calibration parameter for the display system based on the blob location and a detected attribute of each the at least one detected blob; and
   calibrating the display system using the calibration parameter.

* * * * *